United States Patent
Atsuumi et al.

(10) Patent No.: US 10,290,248 B2
(45) Date of Patent: *May 14, 2019

(54) IMAGE DISPLAY APPARATUS AND VEHICLE

(71) Applicant: Ricoh Company, Ltd., Tokyo (JP)

(72) Inventors: Hiromichi Atsuumi, Kanagawa (JP);
Daisuke Ichii, Kanagawa (JP);
Toshihiro Yamashiro, Kanagawa (JP);
Makoto Inamoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/960,626

(22) Filed: Apr. 24, 2018

(65) Prior Publication Data

US 2018/0240387 A1    Aug. 23, 2018

Related U.S. Application Data

(63) Continuation of application No. 15/346,192, filed on Nov. 8, 2016, now Pat. No. 9,997,093.

(30) Foreign Application Priority Data

Nov. 27, 2015    (JP) .................................. 2015-231566

(51) Int. Cl.
*G03B 21/28* (2006.01)
*G09G 3/02* (2006.01)
(Continued)

(52) U.S. Cl.
CPC ........... *G09G 3/025* (2013.01); *G02B 26/101* (2013.01); *G02B 27/0031* (2013.01);
(Continued)

(58) Field of Classification Search
CPC .. G03B 21/28; G03B 21/567; G03B 21/2033; G03B 21/62; G03B 21/2013;
(Continued)

(56) References Cited

U.S. PATENT DOCUMENTS

| 7,944,598 B2 | 5/2011 | Gollier |
| 9,007,532 B2 | 4/2015 | Rumreich |

(Continued)

FOREIGN PATENT DOCUMENTS

JP    2015-169804    9/2015

OTHER PUBLICATIONS

Extended European Search Report dated Apr. 18, 2017 in Patent Application No. 16198947.0.

*Primary Examiner* — Sultan Chowdhury
(74) *Attorney, Agent, or Firm* — Oblon, McClelland, Maier & Neustadt, L.L.P.

(57) ABSTRACT

An image display apparatus and a vehicle provided with the image display apparatus. The image display apparatus includes a light source unit to emit a laser beam, an optical deflector to deflect the laser beam two-dimensionally, and an intermediate image generator to perform two-dimensional scanning twice in a main scanning direction and a sub-scanning direction with the laser beam deflected by the optical deflector to generate an intermediate image of one frame, where the laser beam deflected by the optical deflector draws, two scanning lines. In the image display apparatus, the two scanning lines have two different phases for the two-dimensional scanning for a first time and the two-dimensional scanning for a second time, respectively. in the image display apparatus, the two scanning lines have two different starting points for the two-dimensional scanning for a first time and the two-dimensional scanning for a second time, respectively.

20 Claims, 15 Drawing Sheets

(51) Int. Cl.
*G02B 27/00* (2006.01)
*G02B 27/01* (2006.01)
*H04N 9/31* (2006.01)
*G02B 26/10* (2006.01)
*G02B 27/48* (2006.01)
*G02B 3/00* (2006.01)

(52) U.S. Cl.
CPC ......... *G02B 27/0101* (2013.01); *G02B 27/48* (2013.01); *G03B 21/28* (2013.01); *H04N 9/3135* (2013.01); *G02B 3/0056* (2013.01); *G02B 2027/012* (2013.01); *G02B 2027/0118* (2013.01); *G02B 2027/0145* (2013.01); *G09G 2380/10* (2013.01); *G09G 2380/12* (2013.01)

(58) Field of Classification Search
CPC ........ G02B 26/01; G02B 26/12; G02B 26/10; G02B 26/017; G02B 26/0172; H04N 13/044; H04N 13/0402; H04N 13/0404; H04N 13/0418; H04N 13/0422; H04N 13/0459

See application file for complete search history.

(56) References Cited

U.S. PATENT DOCUMENTS

| | | | |
|---|---|---|---|
| 9,964,845 B2* | 5/2018 | Kurashige | ................ F21S 2/00 |
| 2008/0018558 A1 | 1/2008 | Kykta | |
| 2009/0135374 A1 | 5/2009 | Horiuchi et al. | |
| 2013/0201540 A1* | 8/2013 | Sasaki | ................ G02B 27/0149 359/221.3 |
| 2015/0175054 A1 | 6/2015 | Yatsuda et al. | |
| 2016/0085084 A1 | 3/2016 | Masson | |
| 2016/0116735 A1 | 4/2016 | Hayashi et al. | |
| 2016/0266384 A1 | 9/2016 | Nakamura et al. | |
| 2016/0320615 A1 | 11/2016 | Nakamura et al. | |
| 2016/0320616 A1 | 11/2016 | Ichii | |

* cited by examiner

IMAGE DISPLAY APPARATUS AND VEHICLE

CROSS-REFERENCE TO RELATED APPLICATION

This application is a continuation Application of U.S. application Ser. No. 15/346,192, filed Nov. 8, 2016 which is based on and claims priority pursuant to 35 U.S.C. § 119(a) to Japanese Patent Application No. 2015-231566, filed on Nov. 27, 2015, in the Japan Patent Office. The entire contents of the above-identified applications are incorporated herein by reference.

BACKGROUND

Technical Field

Embodiments, of the present invention relate to an image display apparatus and a vehicle provided with the image display apparatus.

Background Art

Image display apparatuses are known in the art that are provided for mobile objects such as vehicles, aircrafts, and ships, and are used by the drivers of these mobile objects to visually recognize useful information for driving or operating the mobile objects. Such image display apparatuses are called heads-up display (HUD). The useful information for driving or operating the mobile objects includes, for example, the information about objects existing in the viewing field of the driver of the mobile object, the information useful for safe and comfortable driving, and an alert to inform the driver of the operational status of the mobile object.

A HUD displays the information as above in the viewing field of a driver as a virtual image. Accordingly, the driver can visually recognize the above information more securely with reduced movement of line of sight. The HUD generates an image indicating the above information as an intermediate image, and projects the generated intermediate image onto an observation optical system to display a virtual image.

Several kinds of method is known in the art for the HUD to generate an intermediate image. For example, a panel system where an intermediate image is formed by an imaging device such as a liquid crystal and a laser scanning system where an intermediate image is formed by scanning a laser beam emitted from a laser diode by a two-dimensional scanning device are known in the art. In the panel system, full-screen light emission is partially blocked to form an intermediate image. In the laser scanning system, each pixel is assigned to either "emitting" pixel or "non-emitting" pixel to form an intermediate image. As known in the art, a laser scanning system can generate an intermediate image with higher contrast than a panel system does.

In the laser scanning system, a microlens array (MLA) may be used to generate an intermediate image. A microlens array is an optical element on which a plurality of minute lenses (microlenses) are arranged at regular intervals. If these microlenses are two-dimensionally scanned by laser beam, interference patterns such as moire and diffraction patterns due to diffracted light that is strengthened in a certain direction may occur on the exit plane side. Such interference patterns or the like may become a factor in reducing the image quality of an inter mediate image. In other words, the occurrence of such interference patterns or the like may reduce the viewability of information through a virtual image. As known in the art, the shape of microlenses or the like may be modified in order to prevent the interference patterns as above from occurring (see, for example, JP-2015-169804-A).

Moreover, the pitches of microlenses or the pitches of a scanning line on the microlenses relate to the occurrence of moire due to a MLA. Accordingly, in order to improve the image quality of an intermediate image and the viewability of a virtual image in a HUD with a laser scanning system where a MLA is used, there is further room for improvement in the relation between a scanning line and a microlens array.

SUMMARY

Embodiments of the present invention described herein provide an image display apparatus and a vehicle provided with the image display apparatus. The image display apparatus includes a light source unit to emit a laser beam, an optical deflector to deflect the laser beam two-dimensionally, and an intermediate image generator to perform two-dimensional scanning twice in a main scanning direction and a sub-scanning direction with the laser beam deflected by the optical deflector to generate an intermediate image of one frame, where the laser beam deflected by the optical deflector draws two scanning lines when the two-dimensional scanning is performed twice. In the image display apparatus, the two scanning lines have two different phases for the two-dimensional scanning for a first time and the two-dimensional scanning for a second time, respectively. In the image display apparatus, the two scanning lines have two different starting points for the two-dimensional scanning for a first time and the two-dimensional scanning for a second time, respectively, and the two different starting points are shifted from each other in the sub-scanning direction. In the image display apparatus, the two scanning lines have two different amplitude centers for the two-dimensional scanning for a first time and the two-dimensional scanning for a second time, respectively, and the two different amplitude centers are shifted from each other in the sub-scanning direction. In the vehicle, the image display apparatus displays the intermediate image to a driver as a virtual image.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
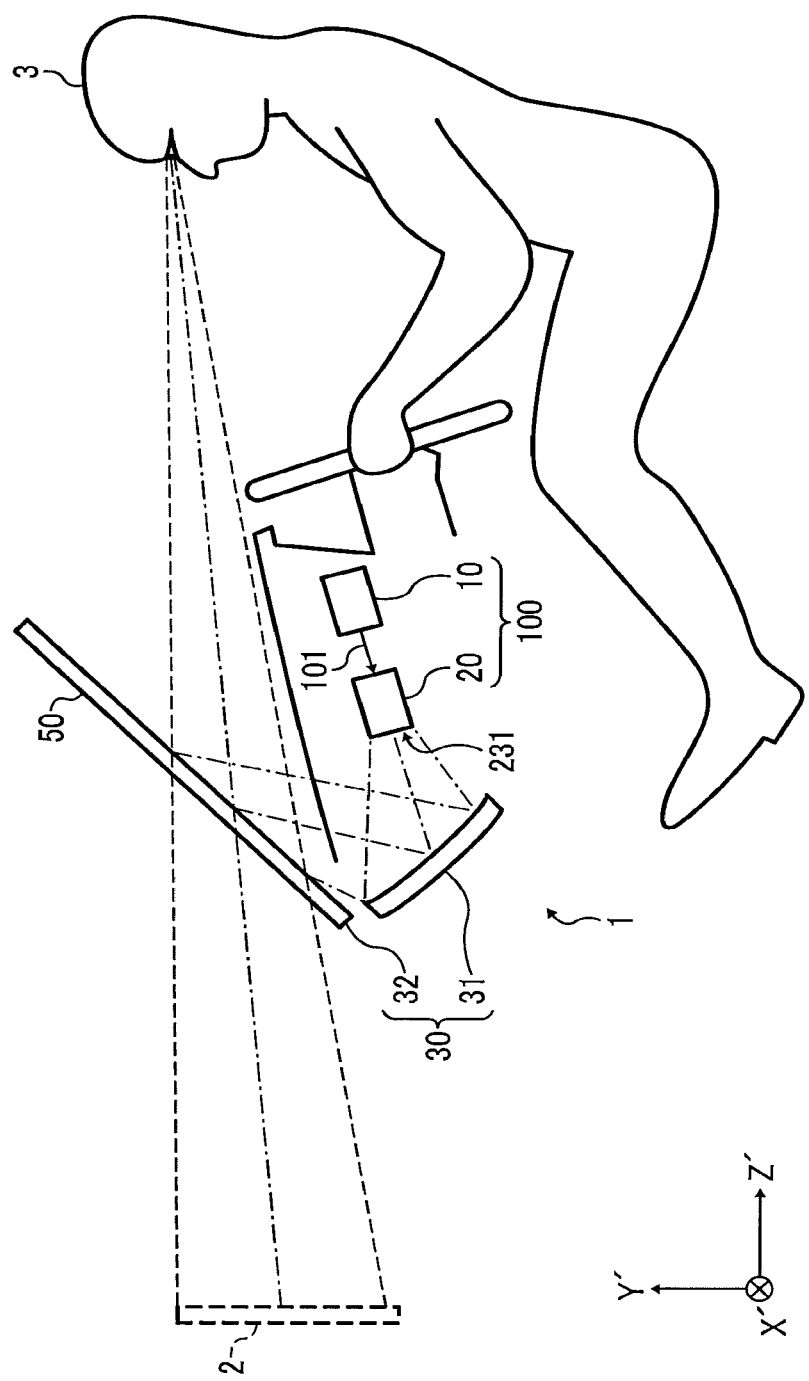
FIG. 1 is a schematic diagram of an image display apparatus according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations. elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Outline of Image Display Apparatus

Hereinafter, an image display apparatus according to an embodiment of the present invention is described with reference to the drawings. In the present embodiment, cases in which the HUD 1 is installed in a vehicle are described.

FIG. 1 is a schematic diagram of an image display apparatus according to an embodiment of the present invention.

As illustrated in FIG. 1, the HUD 1 includes a light source unit 10, a scanning optical system 20, and an observation optical system 30. The light source unit 10 and the scanning optical system 20 together form an image generator 100.

The HUD 1 is an image display apparatus that displays information useful for a driver 3 of the vehicle within the viewing field of the driver 3 so as to be visually recognizable as a virtual image 2. The information useful for the driver 3 includes, for example, the information about objects existing in the viewing field of the driver 3, the information useful for safe and comfortable driving, and an alert to inform the driver 3 of the operational status of the vehicle. In the present description, the "information useful for the driver 3" may be referred to simply as "information".

The HUD 1 projects an intermediate image 231 formed by the image generator 100 onto an observation optical system 30 to display a virtual image 2. The driver 3 visually recognizes the intermediate image 231 that is projected onto an optical combiner 32 of the observation optical system 30 as the virtual image 2. As illustrated in FIG. 1, a front windshield 50 of the vehicle may be used as the optical combiner 32 of the HUD 1. The front windshield 50 is a kind of transmission and reflection member. The front windshield 50 reflects the projected intermediate image 231 towards the driver 3, and passes through the light (extraneous light) from the ambient environment or an object existing in the viewing field of the driver 3. Accordingly, the driver 3 can visually recognize the virtual image 2 and various types of objects existing ahead of the vehicle at the same time. Note that an additional transmissive and reflective optical element, which is independent of the front windshield 50, may be disposed so as to serve as the optical combiner 32 in the HUD 1.

Next, the elements of the HUD 1 are described.

Outline of Light Source Unit 10

The light source unit 10 is a laser beam source that emits a laser beam, and the laser beam emitted from the light source unit 10 is used to generate the intermediate image 231. If it is desired that the intermediate image 231 be a color image and that the information to be indicated on the virtual image 2 be in color, the light source unit 10 emits a laser-beam bundle that corresponds to the trichromatic colors of light required for forming a color image.

Outline of Scanning Optical System 20

The scanning optical system 20 two-dimensionally deflects the laser beam emitted from the light source unit 10, and scans the intermediate image generator two-dimensionally. The intermediate image generator is a microlens array 23 as will be described later. In other words, the scanning optical system 20 performs two-dimensional scanning with the laser beam emitted from the light source unit 10 to generate the intermediate image 231. In the present embodiment, the intermediate image 231 includes certain information to be indicated on the virtual image 2.

Outline of Observation Optical System 30

The intermediate image 231 that is generated by the scanning optical system 20 is magnified by the concave mirror 31 that is a reflective optical element of the observation optical system 30, and is projected onto the optical combiner 32. The intermediate image 231 that is magnified and projected onto the optical combiner 32 is reflected by the optical combiner 32 towards the driver 3.

The intermediate image 231 that is reflected by the optical combiner 32 is visually recognized as the virtual image 2 at a position different from the physical position of the optical combiner 32 in a direction away from the, driver 3. As described above, the information that can be recognized from the virtual image 2 relates to the operation of the vehicle, and is, for example, the speed or mileage of the vehicle, and the navigation information such as destination display.

Note that the viewpoint of the driver 3 merely indicates a reference position (reference eye point). It is assumed that the range of the viewpoint of the driver 3 is equal to or less than the eye range of driver of the vehicle (JIS D 0021).

Here, the "directions" in the description of the present embodiment are defined. The intermediate image 231 is formed by the two-dimensional scanning that is performed by the scanning optical system 20, and such two-dimensional scanning includes main scanning and sub-scanning. The main-scanning direction when the intermediate image 231 is formed is referred to as the "X direction", and the sub-scanning direction is referred to as the "Y direction". In the present embodiment, the horizontal directions of the virtual image 2 that the driver 3 visually recognizes are referred to as the main scanning direction (X direction) on the intermediate image 231, and the vertical directions of the virtual image 2 are referred to as the sub-scanning direction (Y direction) on the intermediate image 231. Even if the physical directions vary, the horizontal directions of the virtual image 2 are referred to as the X direction assuming that the horizontal directions correspond to the main scanning directions of the intermediate image 231. In a similar manner, even if the physical directions vary, the vertical directions of the virtual image 2 are referred to as the Y direction assuming that the vertical directions correspond to the sub-scanning directions of the intermediate image 231.

When the HUD 1 is installed in a vehicle, as illustrated in FIG. 1, the directions of travel of the vehicle, the right and left directions of the vehicle, and the up-and-down directions of the vehicle are referred to as the "Z' direction", "X' direction", and the "Y' direction", respectively. In this case, the direction from the virtual image 2 to the driver 3 (i.e., the backward direction of the vehicle) is referred to as the +Z' direction, and the line-of-sight direction of the driver 3 (i.e., the direction of travel of the vehicle) is referred to as the −Z' direction. The right direction of the driver 3 (i.e., the back-side direction of the paper on which FIG. 1 is drawn) is referred to as the +X' direction, and the left direction of the driver 3 (i.e., the front-side direction of the paper on which FIG. 1 is drawn) is referred to as the −X' direction. Moreover, the upper direction of the driver 3 is referred to as the +Y' direction, and the lower direction of the driver 3 is referred to as the −Y' direction.

In FIG. 1, the X directions of the virtual image 2 match the X' directions (right and left directions) of the vehicle. Moreover, the Y directions of the virtual image 2 match the Y' directions (upper and lower directions) of the vehicle. On the other hand, the X directions (i.e., the main scanning directions) of the intermediate image 231 that is generated by the scanning optical system 20 do not always match the X' directions (right and left directions) of the vehicle. In a similar manner, the Y directions (i.e., the sub-scanning directions) of the intermediate image 231 do not always match the Y' directions (upper and lower directions) of the vehicle. This is because due to the arrangement or directions of the optical elements of the scanning optical system 20 and the optical arrangement of the scanning optical system 20 and the observation optical system 30, the physical directions of the main scanning directions and the sub-scanning directions of the intermediate image 231 are not always orthogonal to the X' axis, the Y' axis, and the Z' axis.

Example Configuration of Light Source Unit 10

Next, an example configuration of the light source unit 10 is described in detail with reference to FIG. 2.

Figure 2:
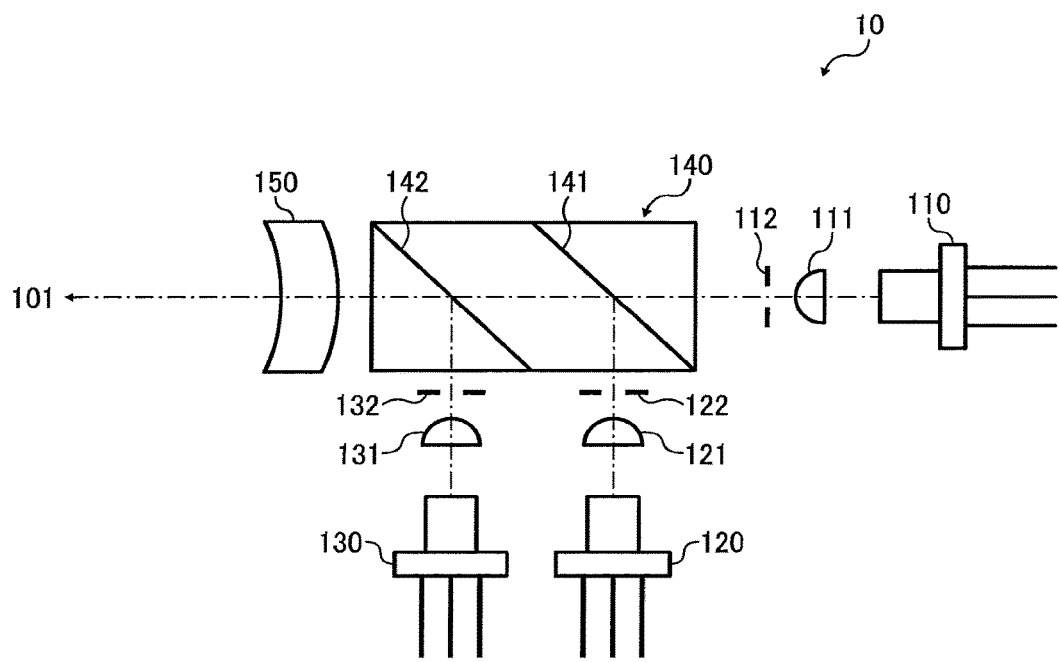
FIG. 2 is a schematic diagram of a light source unit in the image display apparatus of FIG. 1.

FIG. 2 is a schematic diagram of a light source unit in the image display apparatus of FIG. 1.

In order to make the virtual image 2 become a color image, the light source unit 10 combines the light beams of the trichromatic colors of, light into one bundle and emits the combined bundle of light beams. In the following description of the present embodiment, the light beam that is emitted from the light source unit 10 and heads for the optical deflector, as will be described later, is referred to as a first light beam 101.

The light source unit 10 includes, for example, three semiconductor laser devices. These three semiconductor laser devices are the elements of the light source each of which corresponds to one of the trichromatic colors of light. The first laser device 110 emits red (R) laser beams. The second laser device 120 emits green (G) laser beams. The third laser device 130 emits blue (B) laser beams.

Note also that laser diodes (LDs) or vertical-cavity surface-emitting lasers (VCSEL), which are called end-surface emitting laser, may be used as the laser devices of the light source unit 10. Alternatively, light-emitting diode (LED) devices may be used instead of the semiconductor laser devices.

In addition to the laser devices, the light source unit 10 is provided with coupling lenses that control the divergence of the laser beams emitted from the laser devices. Moreover, the light source unit 10 is provided with apertures that restrict and shape the diameters of the laser-beam bundles passed through the coupling lenses. Further, the light source unit 10 is provided with a beam combining prism 140 and a lens 150 that combine and emit the laser-beam bundles of each color that are shaped by the apertures.

The coupling lenses that correspond to the laser devices of each color are referred to as a first coupling lens 111, a second coupling lens 121, and a third coupling lens 131.

The apertures that correspond to the laser devices are referred to as a first aperture 112, a second aperture 122, and a third aperture 132.

The beam combining prism 140 includes a first dichroic film 141 that transmits red laser beams and reflects green laser beams, and a second dichroic film 142 that transmits red and green laser beams and reflects blue laser beams.

The lens 150 transforms the light beams emitted from the beam combining prism 140 into beams in a desired concentrated state.

The wavelength λR of the laser-beam bundle (laser beams) that is emitted from the first laser device 110 is, for example, 640 nanometer (nm). The wavelength λG of the laser-beam bundle (laser beams) that is emitted from the second laser device 120 is, for example. 530 run. The wavelength λB of the laser-beam bundle (laser beams) that is emitted from the third laser device 130 is, for example, 445 nm.

The red laser beam that is emitted from the first laser device 110 passes through the first coupling lens 111 and the first aperture 112, and enters the beam combining prism 140.

The red laser beam that has entered the beam combining prism 140 passes through the first dichroic film 141 and traveling in a straight line.

The green laser beam that is emitted from the second laser device 120 passes through the second coupling lens 121 and the second aperture 122, and enters the beam combining prism 140. The green laser beam that has entered the beam combining prism 140 is reflected by the first dichroic film 141 and travels in the same direction as the red laser beam (i.e., towards the second dichroic film 142).

The blue laser beam that is emitted from the third laser device 130 passes through the third coupling lens 131 and the third aperture 132, and enters the beam combining prism 140. The blue laser beam that has entered, the beam combining prism 140 is reflected by the second dichroic film 142 and travels in the same direction as the red laser beam and the green laser beam.

As described above, the combined light beams of the red laser beam. the green laser beam, and the blue laser beam are emitted from the beam combining prism 140.

The light beams that are emitted from the beam combining prism 140 are transformed by the lens 150 into the first light beam 101, which are beams in a desired concentrated state. The first light beam 101 is formed by combining the red laser beam, the green laser beam, and the blue laser beam together as one laser-beam bundle.

The intensity of the laser-beam bundles of R (red), G (green), and B (blue) that are included in the first light beam 101 is modulated according to the picture signal of a two-dimensional color image to be displayed. Alternatively, intensity modulation may be performed according to the image data of a two-dimensional color image to be displayed. The intensity modulation of the laser-beam bundle may be performed through direct modulation in which the semiconductor laser of each color is directly modulated or through external modulation in which the laser-beam bundle emitted from the semiconductor laser of each color is modulated.

Note also that the apertures may have various kinds of shapes such as a circle, an ellipse, a rectangle, and a square according to the divergence angle of a laser-beam bundle emitted from each of the laser devices. The lens 150 is a meniscus lens that has a concave surface towards a MEMS mirror 21 as will be described later.

Example Configuration of Scanning Optical System 20

Figure 3:
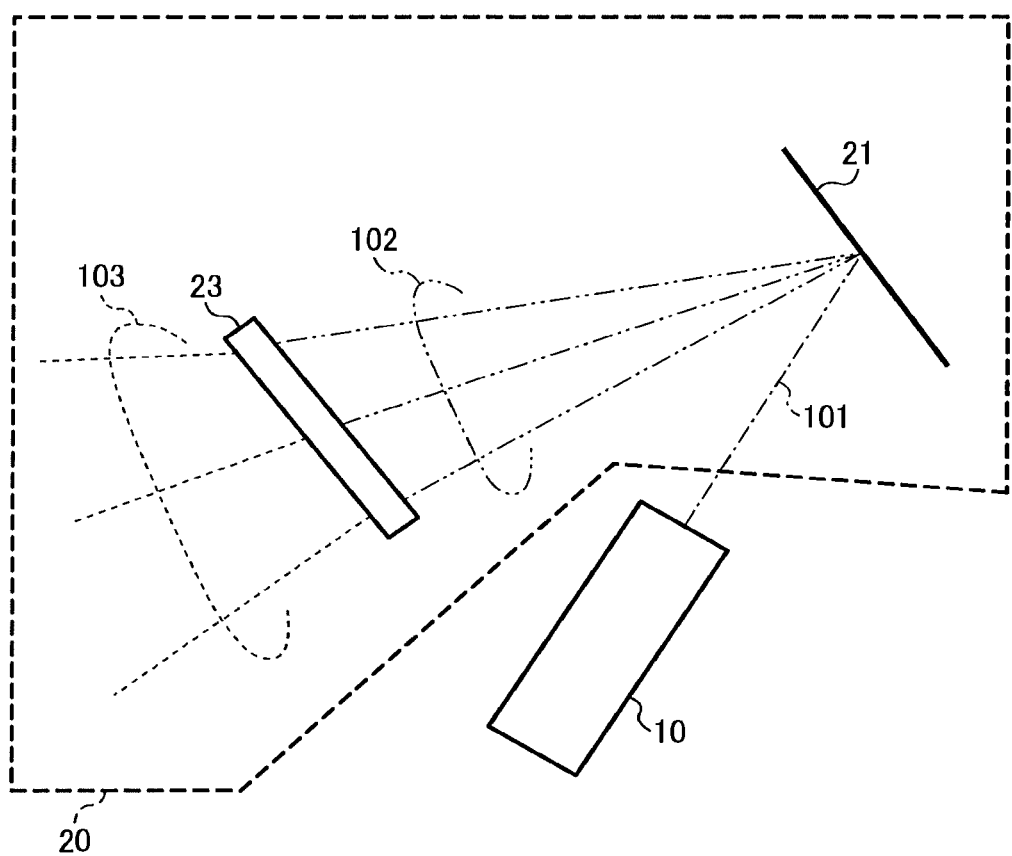
FIG. 3 is a schematic diagram of a scanning optical system in the image display apparatus of FIG. 1.

FIG. 3 is a schematic diagram of a scanning optical system in the image display apparatus of FIG. 1.

As illustrated in FIG. 3, the scanning optical system 20 includes a MEMS mirror 21 and a microlens array 23. In the scanning optical system 20, the MEMS mirror 21 deflects the first light beam 101 emitted from the light source unit 10 to form a second light beam 102, and the second light beam 102 enters the microlens array 23. Then, the microlens array 23 is two-dimensionally scanned in the main scanning directions and the sub-scanning directions by the second light beam 102, and the intermediate image 231 is generated. An image light (light for projecting an image) 103 according to the formed intermediate image 231 is emitted from the exit plane of the microlens array 23, and heads for the observation optical system 30.

Figure 15:
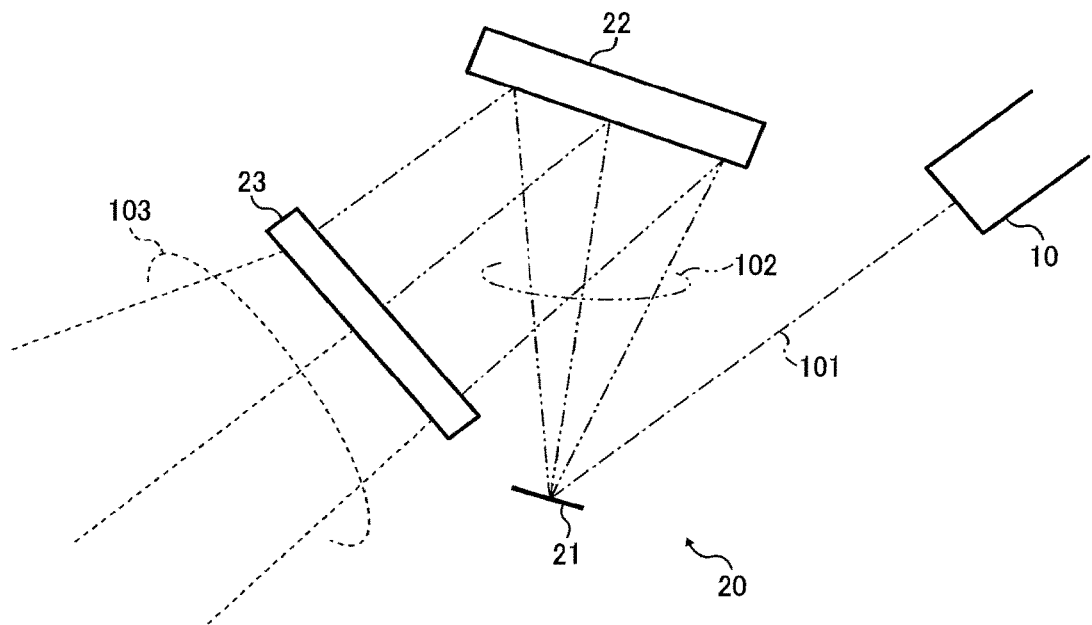
FIG. 15 is a schematic diagram illustrating an alternative embodiment of a scanning optical system according to the image display apparatus of FIG. 1.

FIG. 15 is a schematic diagram illustrating an alternative embodiment of a scanning optical system according to the image display apparatus of FIG. 1.

As illustrated in FIG. 15, the scanning optical system 20 may include a plane mirror 22 between the MEMS mirror 21 and the microlens array 23.

MEMS Mirror 21

Next, the MEMS mirror 21 is described in detail. The MEMS mirror 21 two-dimensionally deflects the first light beam 101 emitted from the light source unit 10 to form the second light beam 102, and the second light beam 102 enters the microlens array 23. By so doing, the MEMS mirror 21 controls the scanning for generating the intermediate image 231. The MEMS mirror 21 consists of micro-electromechanical systems (MEMS) that are manufactured by semiconductor processes or the like as a minute pivoting mirror element.

Figure 4:
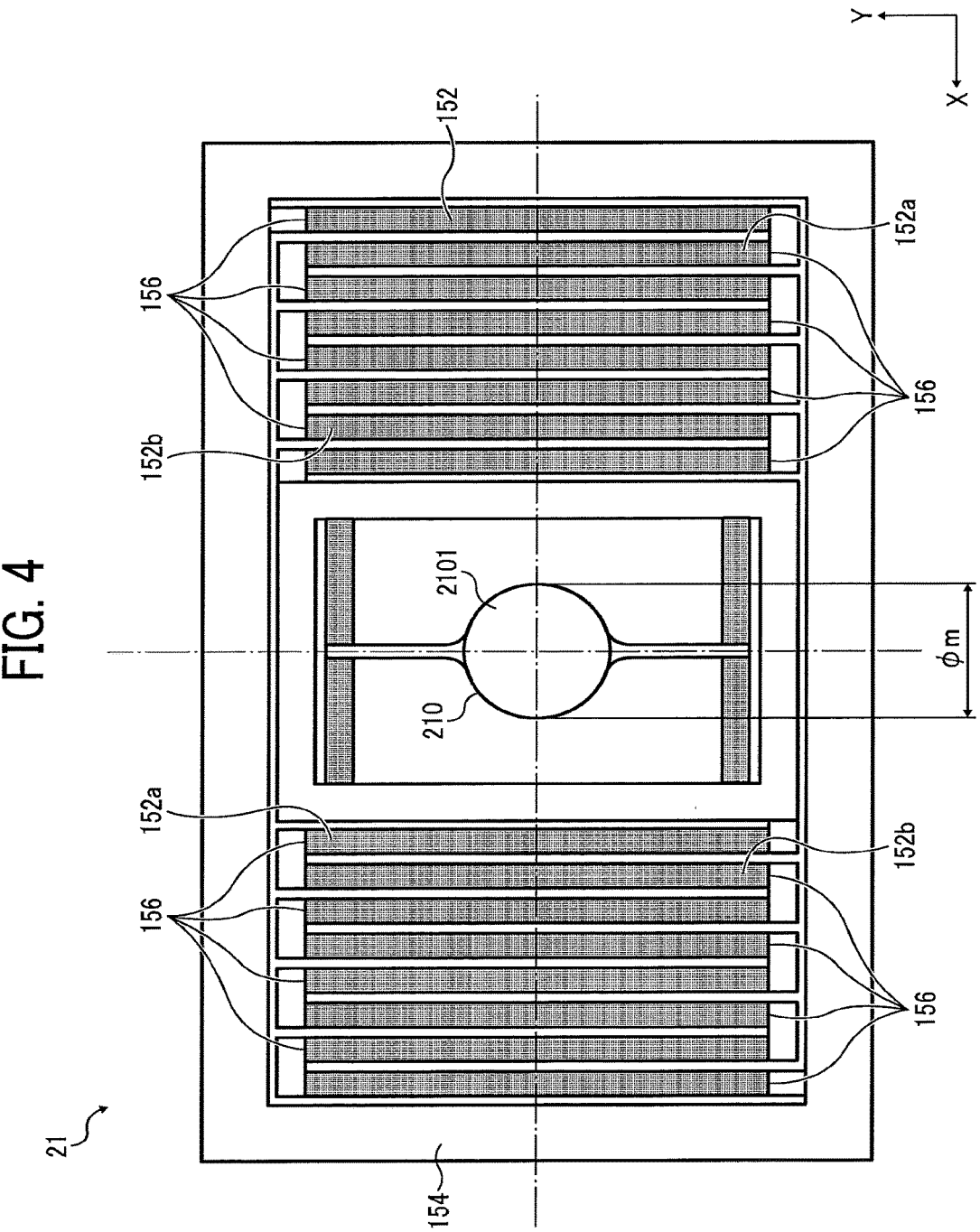
FIG. 4 is a plan view of an optical deflector in the image display apparatus of FIG. 1.

FIG. 4 is a plan view of the optical deflector in the image display apparatus of FIG. 1.

As illustrated in FIG. 4, the MEMS mirror 21 is provided with a micromirror 210 in the center. The micromirror 210 has a reflection plane 2101, and the reflection plane 2101 serves as an optical deflector.

The reflection plane 2101 of the micromirror 210 two-dimensionally deflects the first light beam 101. The reflection plane 2101 is configured to rotate around two axes. When the reflection plane 2101 rotates around the axis in the Y direction, direction of travel of the second light beam 102 is changed in the X direction. Accordingly, when the reflection plane 2101 rotates around the axis in the Y direction, main scanning for forming the intermediate image 231 is performed. When the reflection plane 2101 rotates around the axis in the X direction, direction of travel of the second light beam 102 is changed in the Y direction. Accordingly, when the reflection plane 2101 rotates around the axis in the X direction, sub-scanning for forming the intermediate image 231 is performed. In other words, the X direction and the Y direction in FIG. 4 correspond to the main scanning direction and the sub-scanning direction, respectively.

The MEMS mirror 21 performs sinusoidal oscillation in the main scanning direction, and performs sawtooth oscillation in the sub-scanning direction. By so doing, the MEMS mirror 21 deflects and scans the microlens array 23 two-dimensionally.

On both sides of the micromirror 210 in the X direction, a pair of serpentine beams 152 including a plurality of turning portions are arranged. The serpentine beams 152 are divided into first beams 152a and second beams 152b that alternate and are adjacent to each other, and each of the first beams 152a and the second beams 152b are provided with a piezoelectric member 156. The piezoelectric member 156 used here is, for example, lead zirconate titanate (PZT).

The first beams 152a and the second beams 152b, which are adjacent to each other, are independently applied with different voltage. These voltages that are independently applied as above have voltage values that are different from each other. As the first beams 152a and the second beams 152b are independently applied with different voltage, each of the first beams 152a and the second beams 152b are differently curved. The direction of the curve is determined by the applied voltage. In other words, the first beams 152a and the second beams 152b, which are adjacent to each other, are curved at different angles. Note also that the serpentine beams 152 are supported by a frame member 154.

As the above deformation (curve) is accumulated, the micromirror 210 rotates in such a manner that the angle of the reflection plane 2101 changes around the axis in the X direction. The first light beam 101 is reflected due to the rotation of the reflection plane 2101 around the axis in the X direction, and the second light beam 102 scans the microlens 10 array 23 in the Y direction.

The sawtooth oscillations of the MEMS mirror 21 in the sub-scanning direction are controlled by the above applied voltage. Due to the use of the MEMS mirror 21 that is configured as above, the second light beam 102 can scan the microlens array 23 two-dimensionally. Note that the relation between the driving voltage of the MEMS mirror 21 and the two-dimensional scanning is described later in detail.

The MEMS mirror 21 that is configured as above can perform optical scanning in the sub-scanning direction (Y direction), where the axis in the X direction is the center of rotation, with low voltage. On the other hand, the optical scanning in the main scanning direction (X direction), where the axis in the Y direction is the center of rotation, is performed with resonance using, for example, a torsion bar that is connected to the micromirror 210.

Microlens Array 23

Next, the microlens array is described in detail. In the microlens array 23, the lens surface on which minute convex lenses are arrayed in two dimensions serves as the incident plane, and the plane on the other side of the lens surface serves as the exit plane.

Figure 5:
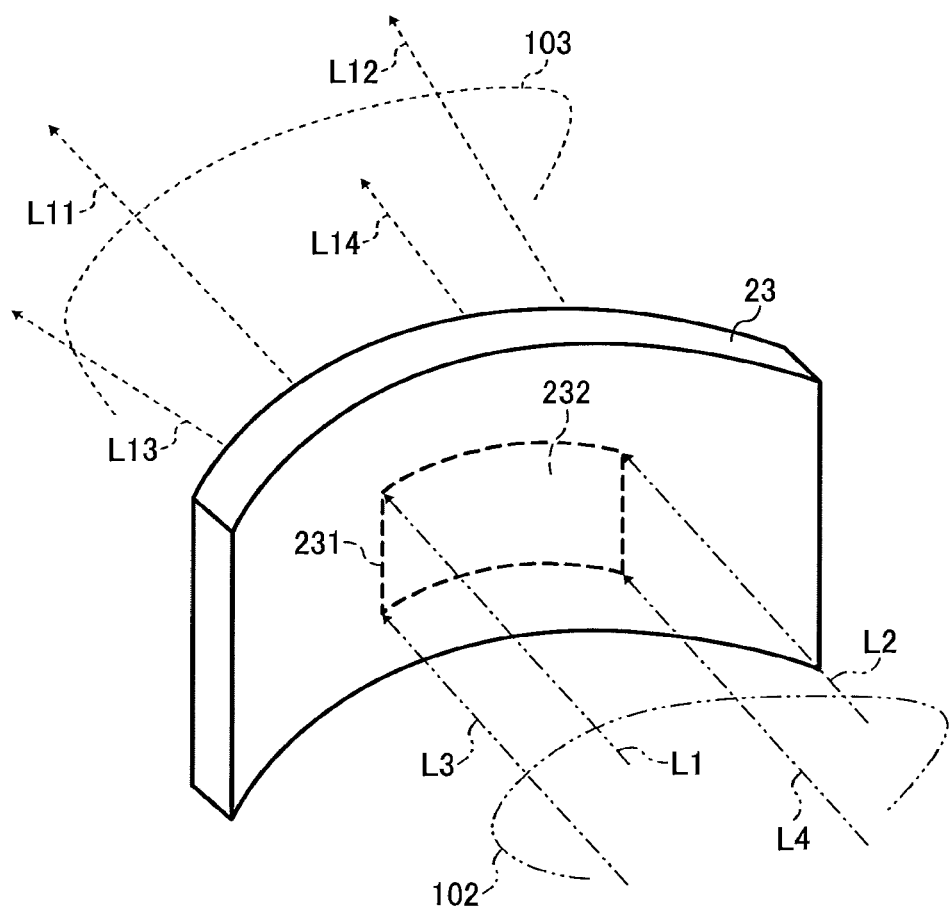
FIG. 5 is a perspective view of an intermediate image generator of the image display apparatus of FIG. 1.

FIG. 5 is a perspective view of the microlens array 23 when viewed from the incident plane side, according to the present embodiment.

As illustrated in FIG. 5, the second light beam 102 that has entered the lens surface is diffused and emitted from the exit plane. For example, raster scanning in which high-speed scanning is performed in the main scanning direction and low-speed scanning is performed in the sub-scanning direction is performed by the MEMS mirror 21.

The rectangular region that is depicted by dotted line in FIG. 5 indicates the external shape of an area where the intermediate image 231 is generated. The area inside the above dotted line serves as a scanning area that is effective in generating the intermediate image 231. Note that such a scanning area effective in generating the intermediate image 231 may be referred to as an effective scanning area 232 in the following description. Although the intermediate image 231 should appear on the exit plane side of the microlens array 23, for the sake of explanatory convenience, the intermediate image 231 is indicated on the incident plane side in FIG. 5.

The second light beam 102 that has been two-dimensionally deflected by the MEMS mirror 21 scans the microlens array 23 in the main scanning direction (X direction) and the sub-scanning direction (Y direction). For example, the second light beam 102 performs scanning in the main scanning direction from L1 to L2 illustrated in FIG. 5, and then performs scanning in the opposite direction from a point one step lower than L2 in the sub-scanning direction. Further, scanning in the main scanning direction is performed from a point two-step lower than L1. In a similar manner, scanning is repeated as above. Finally, two-dimensional scanning is achieved when the scanning reaches L4. Due to such a two-dimensional scanning, as described above, the intermediate image 231 of one frame is generated. After the intermediate image 231 of one frame is generated, scanning starts again from L1 to generate the intermediate image 231 of the next frame.

The intermediate image 231 that is displayed on the microlens array 23 at each moment (at each frame rate) is generated only by the pixels that are being irradiated by the second light beam 102 at that time. In other words, the intermediate image 231 that is a two-dimensional color image is a set of pixels that are being scanned by the second light beam 102 two-dimensionally and displayed at each moment.

As described above, the first light beam 101 that is emitted from the light source unit 10 provided for the HUD 1 is compatible with color imaging. Accordingly, the intermediate image 231 that is generated on the microlens array 23 is a color image. Alternatively, the intermediate image 231 that is monochrome may be generated on the microlens array 23.

In FIG. 5, the microlens array 23 has an external shape that is bent in the main scanning direction (X direction). However, no limitation is intended thereby, and the microlens array 23 according to the present embodiment may have a different external shape. For example, the microlens array 23 may have a planar external shape in both the main scanning direction and the sub-scanning direction.

Control System of Image Generator 100

Here, the configuration of a control system that controls the operation of the image generator 100 provided for the HUD 1 is described.

Figure 6:
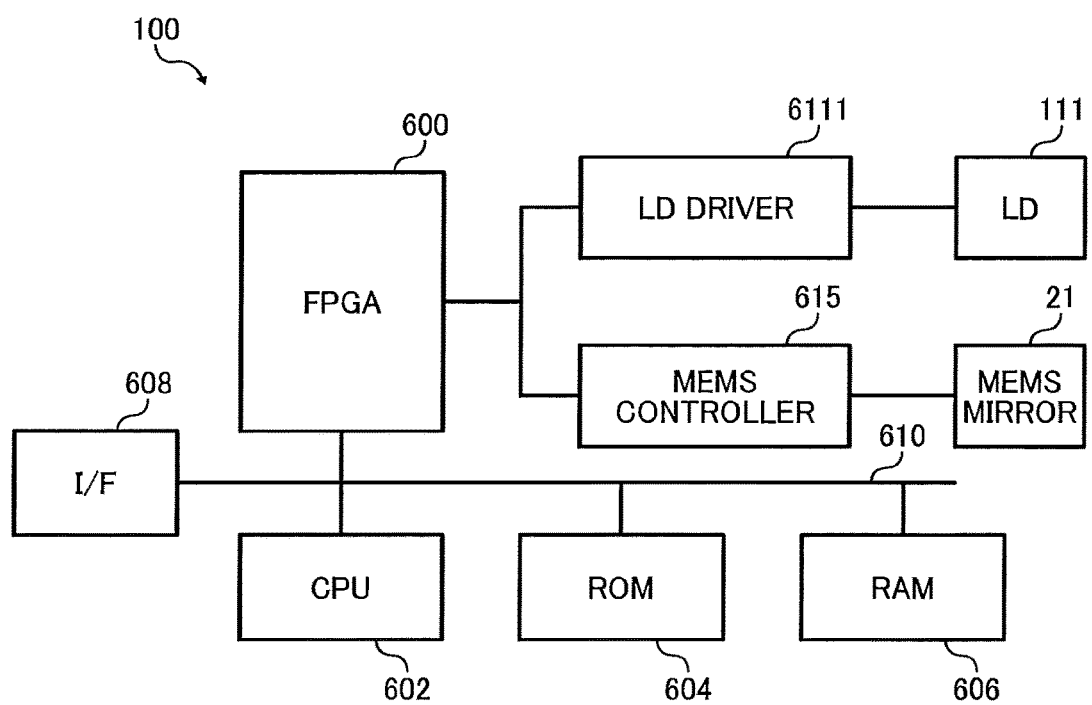
FIG. 6 is a block diagram of a hardware configuration of the image display apparatus of FIG. 1.

FIG. 6 is a block diagram of a hardware configuration of the image display apparatus of FIG. 1.

As illustrated in FIG. 6, the image generator 100 includes a field programmable gate array (FPGA) 600, a central processing unit (CPU) 602, a read only memory (ROM) 604, a random access memory (RAM) 606, an interface (I/F) 608, a bus line 610, a laser diode (LD) driver 6111, and a micro-electromechanical systems (MEMS) controller 615.

The FPGA 600 controls the LD driver 6111 or the MEMS controller 615 to operate the light source unit 10 and the MEMS mirror 21. The CPU 602 controls the operation of the hardware elements provided for the HUD 1. The ROM 604 is a semiconductor memory that stores an image processing program that is executed by the CPU 602 to control the operation of the HUD 1. The RAM 606 is a semiconductor memory that the CPU 602 uses as a work area to control the hardware elements.

The interface 608 is a contact point between the HUD 1 and an external controller or the like. For example, the HUD 1 is connected to a controller area network (CAN) or the like through the interface 608. Accordingly, the HUD 1 can operate while communicating with an external controller or the like that is connected through the CAN.

Functional Configuration of Image Generator 100

Next, the functional configuration of the image generator 100 provided for the HUD 1 is described.

Figure 7:
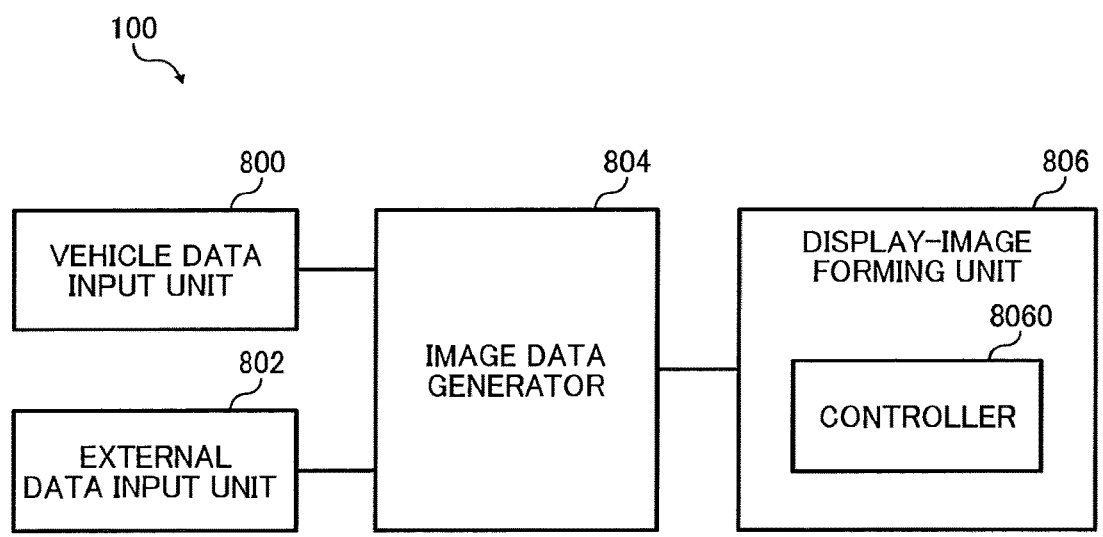
FIG. 7 is a functional block diagram of a functional configuration of the image display apparatus of FIG. 1.

FIG. 7 is a functional block diagram of a functional configuration of the image display apparatus of FIG. 1.

As illustrated in FIG. 7, the image generator 100 includes a vehicle data input unit 800 and an external data input unit 802, an image data generator 804, and a display-image forming unit 806.

The vehicle information input unit 800 obtains information such as the speed or mileage of the vehicle from an external controller or the like that is connected through the interface 608.

The external information input unit 802 obtains information such as the position information given by a global positioning system (GPS) and the traffic information given by a navigation system from an external controller or the like that is connected through the interface 608.

The image data generator 804 generates data for generating the intermediate image 231 according to the data input from the vehicle data input unit 800 and the external data input unit 802. The intermediate image 231 that later forms the virtual image 2 (see FIG. 1).

The display-image forming unit 806 is provided with a controller 8060. The controller 8060 controls the operation of the light source unit 10 or the scanning optical system 20 based on the data generated by the image data generator 804. Due to this control function, the intermediate image 231 that is projected onto the front windshield 50 is generated. According to the operation of the above functional blocks, a state in which the virtual image 2 is visually recognizable, at the viewpoint of the driver 3 can be produced.

Relation Between Microlens Array 23 and Second Light Beam 102

Here, the relation between the structure of the microlens array 23 and the second light beam 102 is described.

Figure 8:
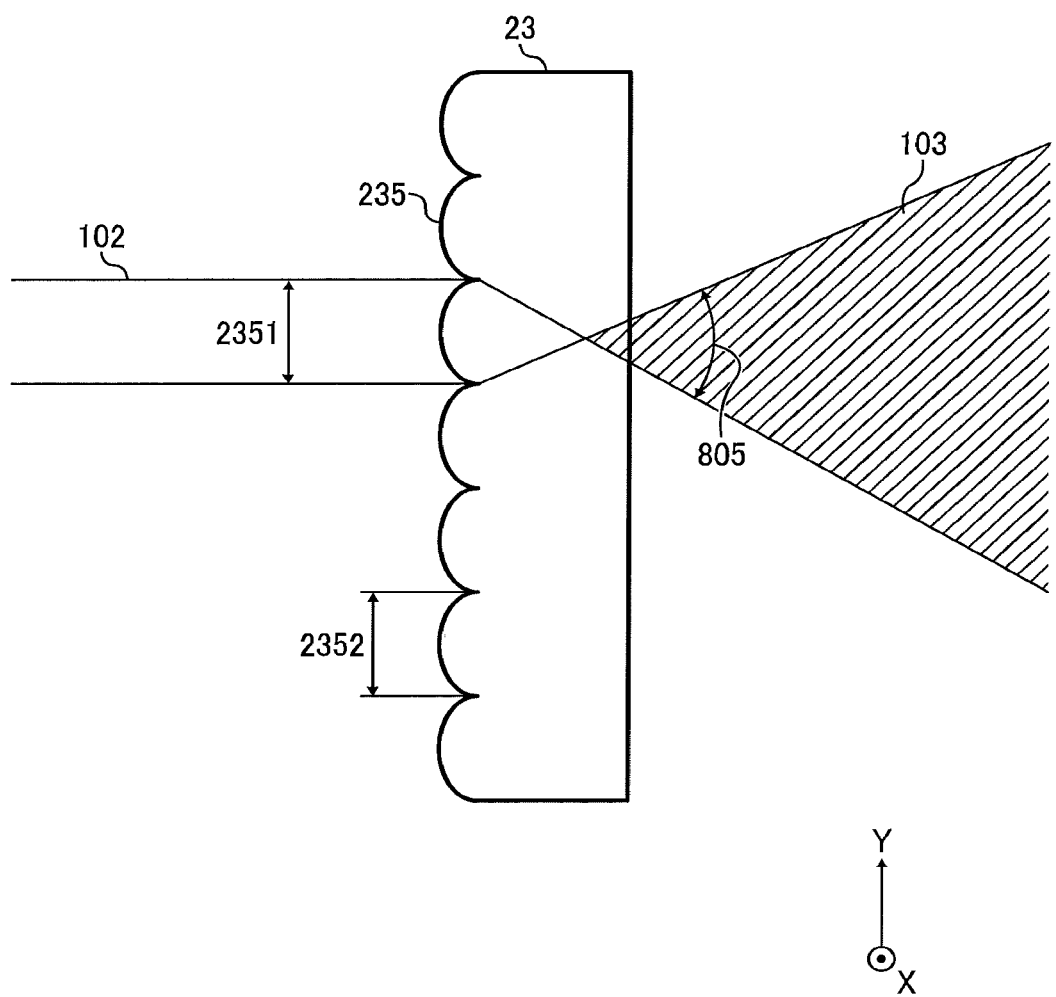
FIG. 8 is a diagram of the intermediate image generator of FIG. 5 when viewed from the main scanning direction, and illustrates how a scanning light beam enters the intermediate image generator, according to an embodiment of the present invention.

FIG. 8 is a diagram of the microlens array 23 when viewed from the main scanning direction (+X direction), according to the present embodiment.

In the microlens array 23, a plurality of microlenses 235 each of which is made of a minute convex lenses are arrayed in the main scanning direction (X direction) and the sub-scanning direction (Y direction). In other words, the microlenses 235 are arrayed in two dimensions in the microlens array 23. Each one of the lens surfaces of the microlenses 235 serves as an incident plane of the microlens array 23, and each light beam that enters the microlens 235 corresponds to each pixel of the intermediate image 231.

As known in the art, a beam spot diameter 2351 of the second light beam 102 that is to enter the microlens 235 is equivalent to a lens pitch 2352 of the array of the microlenses 235 in size.

In order to improve the resolution of the intermediate image 231, it is desired that the lens pitch 2352 be narrow as much as possible. If the lens pitch 2352 is made narrow, the beam spot diameter 2351 needs to be smaller. However, in order to make the beam spot diameter 2351 smaller, the robustness of the product has to be taken into consideration, and difficulties may arise in design and processing. For this reason, it is desired that the beam spot diameter 2351 have a size that does not bring difficulties in design and processing, for example, about 100 μm. Note also that by controlling the radius of curvature of the microlenses 235 to have a desired value, a divergence angle 805 at which the image light 103 is emitted from the microlens array 23 can be adjusted.

Figure 9:
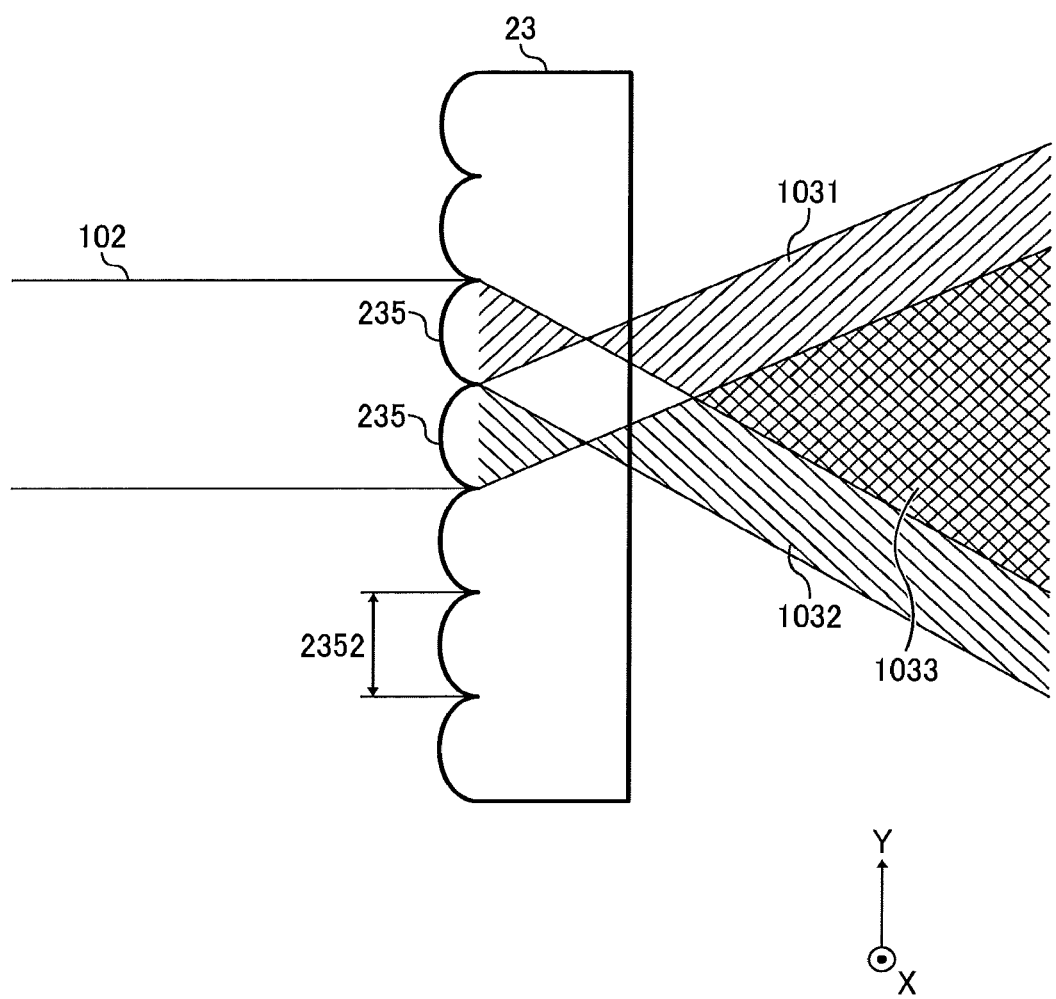
FIG. 9 is a diagram of the intermediate image generator of FIG. 5 when viewed from the main scanning direction, and illustrates how a scanning light beam enters the intermediate image generator according to an alternative embodiment of the present invention.

FIG. 9 is a diagram of the intermediate image generator of FIG. 5 when viewed from the main scanning direction, and illustrates how a scanning light beam enters the intermediate image generator according to an alternative embodiment, of the present invention.

If the lens pitch 2352 is made narrower in the sub-scanning direction (Y direction) with no change in the beam spot diameter 2351, as illustrated in FIG. 9, two laser-beam bundles interfere with each other. FIG. 9 is a diagram illustrating a case in which the beam spot diameter 2351 is about twice wider than the lens pitch 2352. As illustrated in FIG. 9, when the second light beam 102 enters the two microlenses 235 of the microlens array 23 at the same time, corresponding dispersed laser-beam bundles 1031 and 1032 are emitted from the microlens array 23. In such cases, these two dispersed laser-beam bundles 1031 and 1032 exist at the same time in a region 1033 on the exit plane side, and thus these two laser-beam bundles interfere with each other. Such an interference between two laser-beam bundles is visually recognized as a speckle by an observer. A production of such a speckle pattern reduces the quality of the virtual image 2.

As described above, the relation between the beam spot diameter 2351 and the lens pitch 2352 of the microlenses 235 provided for the microlens array 23 has an impact on the image quality of the intermediate image 231. Accordingly, the relation between the lens pitch 2352 of the microlenses 235 and the pitches of a scanning line 237 drawn by the second light beam 102 has an impact on the viewability of the information of the virtual image 2.

Figure 10:
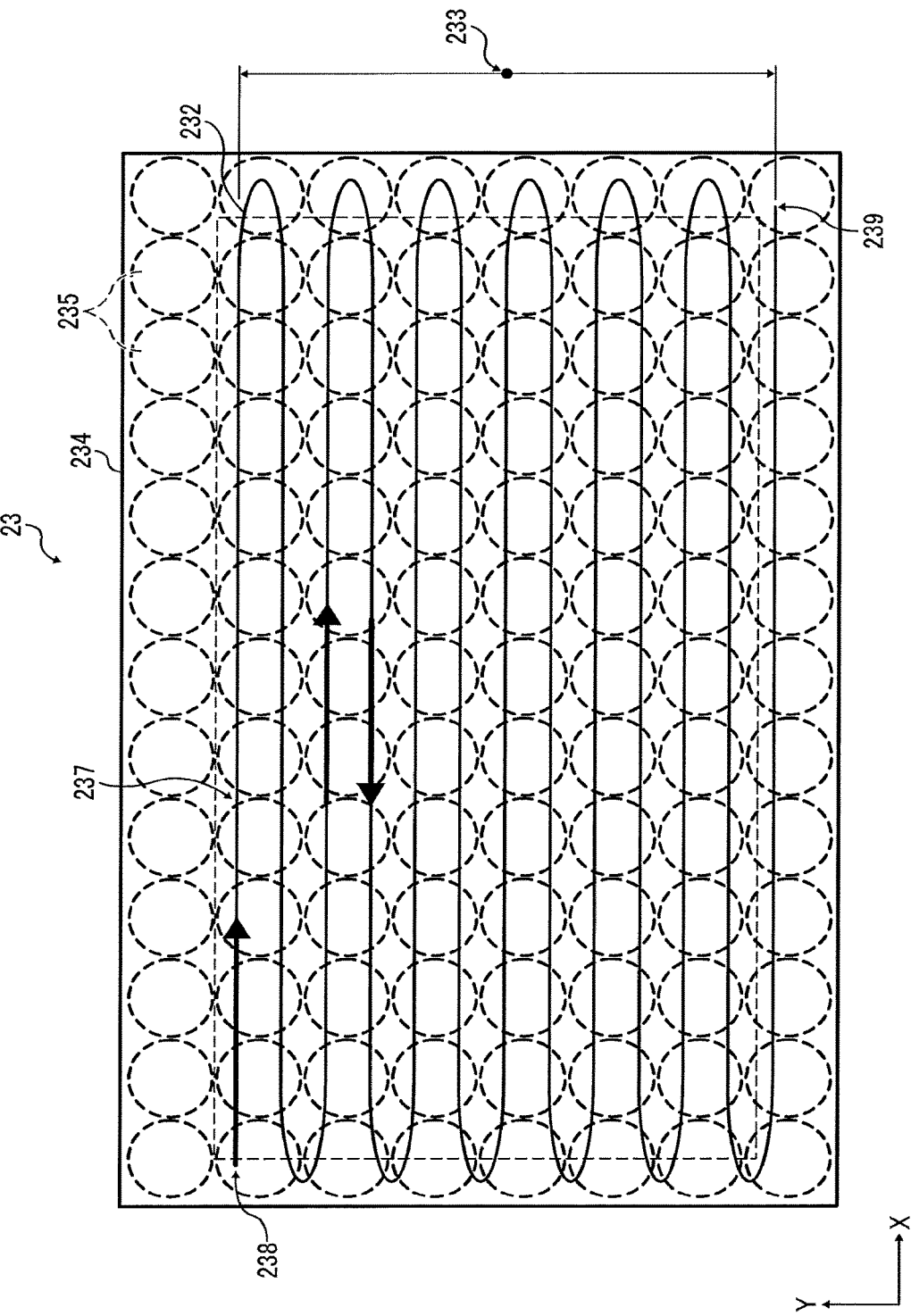
FIG. 10 is a diagram of the intermediate image generator of FIG. 5 when viewed from the incident plane of a scanning light beam, and illustrates a relation between microlenses and a scanning line, according to an embodiment of the present invention.

FIG. 10 is a schematic diagram of the microlens array 23 when viewed from the incident plane side, and illustrates a relation between the microlenses 235 and the scanning line 237, according to the present embodiment.

The relation between an effective scanning area 232 and the two-dimensional scanning by the second light beam 102 is described with reference to FIG. 10. Note that the relation between the microlenses 235 and the effective scanning area 232 in size in FIG. 10 is only schematically illustrated, and is not illustrated at an accurate scale.

The scanning line 237 indicates an example of the trajectory of the main scanning and the sub-scanning on the microlens array 23 followed by the second light beam 102. As illustrated in FIG. 10, the scanning line 237 indicates the trajectory of the two-dimensional scanning performed in the main scanning direction and the sub-scanning direction from a scanning starting point 238 to a scanning ending point 239. A scanning area 234 indicates an area scanned by the scanning line 237 from the scanning starting point 238 to the scanning ending point 239. The scanning line 237 covers every corner of the scanning area 234 and has a trajectory like a picture drawn with a single stroke of the brush.

In a single return scanning movement in the main scanning direction, the scanning line 237 passes through the microlenses 235 that are arranged in the same row. In other words, in the two-dimensional scanning performed on the microlens array 23, the scanning line 237 performs a return scanning for the microlenses 235 that are arranged in the single row in the main scanning direction, and moves towards the sub-scanning direction. The scanning line 237 repeats such a return scanning in the main scanning direction and a movement towards the sub-scanning direction until the scanning ending point 239.

The midpoint of the width between the scanning starting point 238 and the scanning ending point 239 of the scanning line 237 in the sub-scanning direction is referred to as an amplitude's center 233 in the sub-scanning direction.

Figure 11:
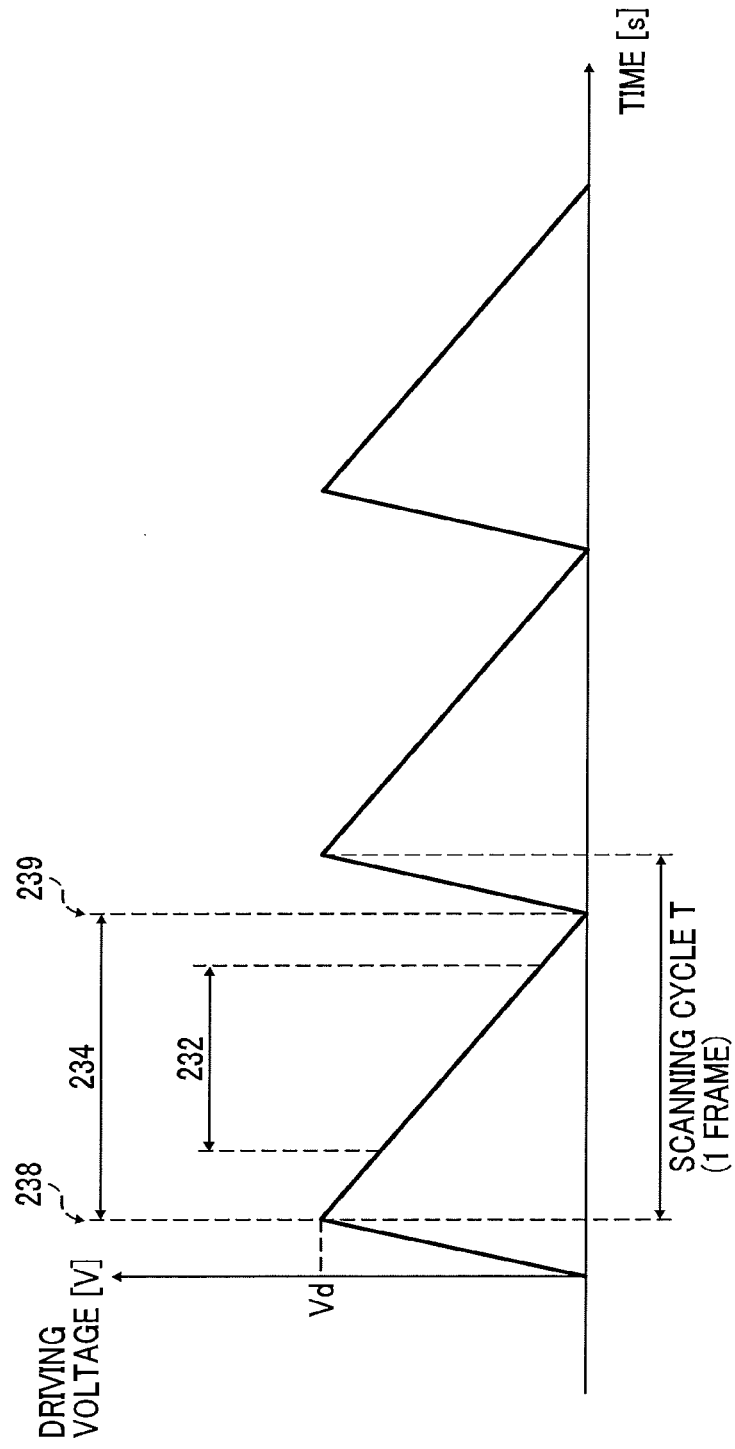
FIG. 11 is a graph illustrating the driving voltage that is applied to the optical deflector of FIG. 4.

FIG. 11 illustrates the change of the driving voltage that controls the operation of the MEMS mirror 21 with respect to time, according to the present embodiment.

As described above, in the MEMS mirror 21, the operation of the micromirror 210 in the main scanning direction is caused by resonance, and the operation of the micromirror 210 in the sub-scanning direction is controlled by the magnitude of the driving voltage. As illustrated in FIG. 11, the driving voltage for the MEMS mirror 21 is controlled so as to decrease linearly from voltage "Vd" to zero over time with a predetermined angle of inclination.

While the driving voltage changes from "Vd" to zero, the reflection plane 2101 of the MEMS mirror 21 changes its orientation from an orientation towards the scanning starting point 238 on the microlens array 23 to an orientation towards the scanning ending point 239 on the microlens array 23.

Note that the length of time while the driving voltage changes from one "Vd" to the next "Vd" corresponds to the scanning cycle (one frame) on the intermediate image 231.

The second light beam 102 scans the incident plane of the microlens array 23 according to the control of the driving voltage as described above. Accordingly, the scanning line 237 draws a sine curve. For this reason, the spacing of the scanning line 237 around the center of the effective scanning area 232 in the sub-scanning direction is different from the spacing of the scanning line 237 around the periphery of the effective scanning area 232 in the sub-scanning direction. In other words, the spacing of the scanning line 237 in the sub-scanning direction becomes relatively constant around the center of the effective scanning area 232, and thus the density of the scanning line 237 is also relatively constant. By contrast, the density of the scanning line 237 tends to become variable around the periphery of the effective scanning area 232. If the density of the scanning line 237 is variable in the sub-scanning direction, moire easily occurs in relation to the lens pitch 2352 of the microlens 235.

The HUD 1 according to the present embodiment performs the above two-dimensional scanning twice to generate the intermediate image 231 of one frame. In so doing, if the density of the scanning line 237 in the sub-scanning direction is variable as above in the first two-dimensional scanning and the second two-dimensional scanning when intermediate image 231 of one frame is generated, the degree of occurrence of moire increases. In such cases, stronger moire occurs at a corner of the effective scanning area 232. In view of the above circumstances, in the HUD 1 according to the present embodiment, the scanning starting point 238 of the first scanning is shifted from the scanning starting point 238 of the second scanning when the intermediate image 231 of one frame is generated.

Figure 12:
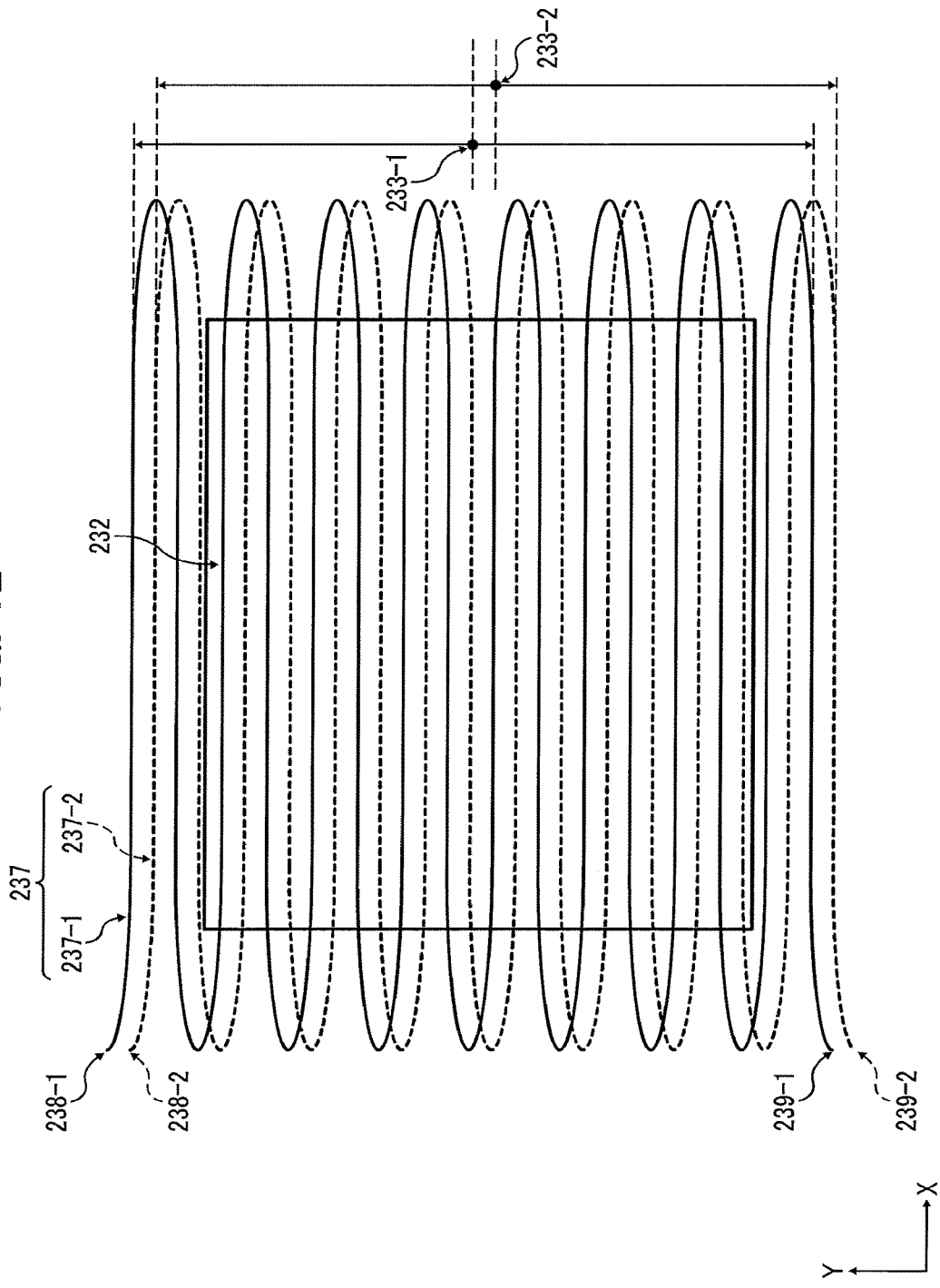
FIG. 12 is a diagram of the intermediate image generator of FIG. 5 when viewed from the incident plane of a scanning light beam, and illustrates a relation between microlenses and a scanning line, according to an alternative embodiment of the present invention.

FIG. 12 is a diagram of the intermediate image generator of FIG. 5 when viewed from the incident plane of a scanning light beam, and illustrates a relation between the microlenses 235 and the scanning line 237, according to the present embodiment.

For example, as illustrated in FIG. 12, the scanning starting point 238 of a first scanning line 237-1 of the first scanning is referred to as a first scanning starting point 238-1, and the scanning ending point 239 of the first scanning line 237-1 is referred to as a first scanning ending point 239-1. in a similar manner, the scanning starting point 238 of a second scanning line 237-2 of the second scanning is referred to as a second scanning starting point 238-2, and the scanning, ending point 239 of the second scanning line 237-2 is referred to as a second scanning ending point 239-2.

The driving voltage that is to be applied to the MEMS mirror 21 is controlled such that the first scanning starting point 238-1 and the second scanning starting point 238-2 are displaced from each other. Accordingly, the phase of the first scanning line 237-1 is shifted from the phase of the second scanning line 237-2. If the phase of the first scanning line 237-1 is shifted from the phase of the second scanning line 237-2, as illustrated in FIG. 12, the density of the scanning line 237 in the effective scanning area 232 increases. By adopting such configuration as above, development of moire on the intermediate image 231 can be prevented. In particular, the development of moire can be prevented around the periphery of intermediate image 231 in the main scanning direction where the scanning line 237 tends to be spaced unevenly. Such a density of a scanning line may be referred to as a scanning line density in the following description.

More detailed description is given below. For example, it is assumed that in the MEMS mirror 21, the resonance frequency that causes the operation of the micromirror 210 in the main scanning direction is 18 kilohertz kHz), and that the frequency of the driving voltage that causes the operation of the micromirror 210 in the sub-scanning direction is 60 hertz (Hz). In such a configuration, three hundred cycles of the scanning line 237 are drawn in the scanning area 234. In other words, the scanning line 237 repeats go and return three hundred times to generate the intermediate image 231 of one frame.

Here, it is assumed that the dimension of the microlens array 23 in the sub-scanning direction is 30 millimeters (mm). In this case, the scanning line 237 is spaced at intervals of 50 micrometers (μm) in the sub-scanning direction. In such cases, on the periphery of the intermediate image 231 in the main scanning direction where the lens pitch 2352 of the microlenses 235 in the sub-scanning direction is assumed to be about 100 μm, the value of the lens pitch 2352 becomes close to the spacing of the scanning line 237. Accordingly, moire of frequencies with high visual recognizability for human eyes easily occurs. By contrast, when scanning is performed twice to generate the intermediate image 231 of one frame as described above, the first scanning line 237-1 and the second scanning line 237-2 are spaced on the periphery of intermediate image 231 in the main scanning direction at intervals of 25 μm. If the MEMS mirror 21 is controlled as above such that the intermediate image 231 of one frame is generated by a plurality of times of scanning, the density of the scanning line increases, and the development of moire can be prevented. In other words, the visibility of the virtual image 2 in the HUD 1 improves.

It is desired that the first scanning, line 237-1 and the second scanning line 237-2 when two-dimensional scanning is performed twice have a phase difference of one fourth cycle. Accordingly, the scanning line is evenly spaced, and variability of density in the sub-scanning direction is prevented. As a result. the development of moire can be prevented effectively around the periphery of the intermediate image 231 in the sub-scanning direction.

Here, the control of the MEMS mirror 21 in order to perform scanning twice to generate the intermediate image 231 of one frame, as illustrated in FIG. 12, is described with reference to FIG. 13.

Figure 13:
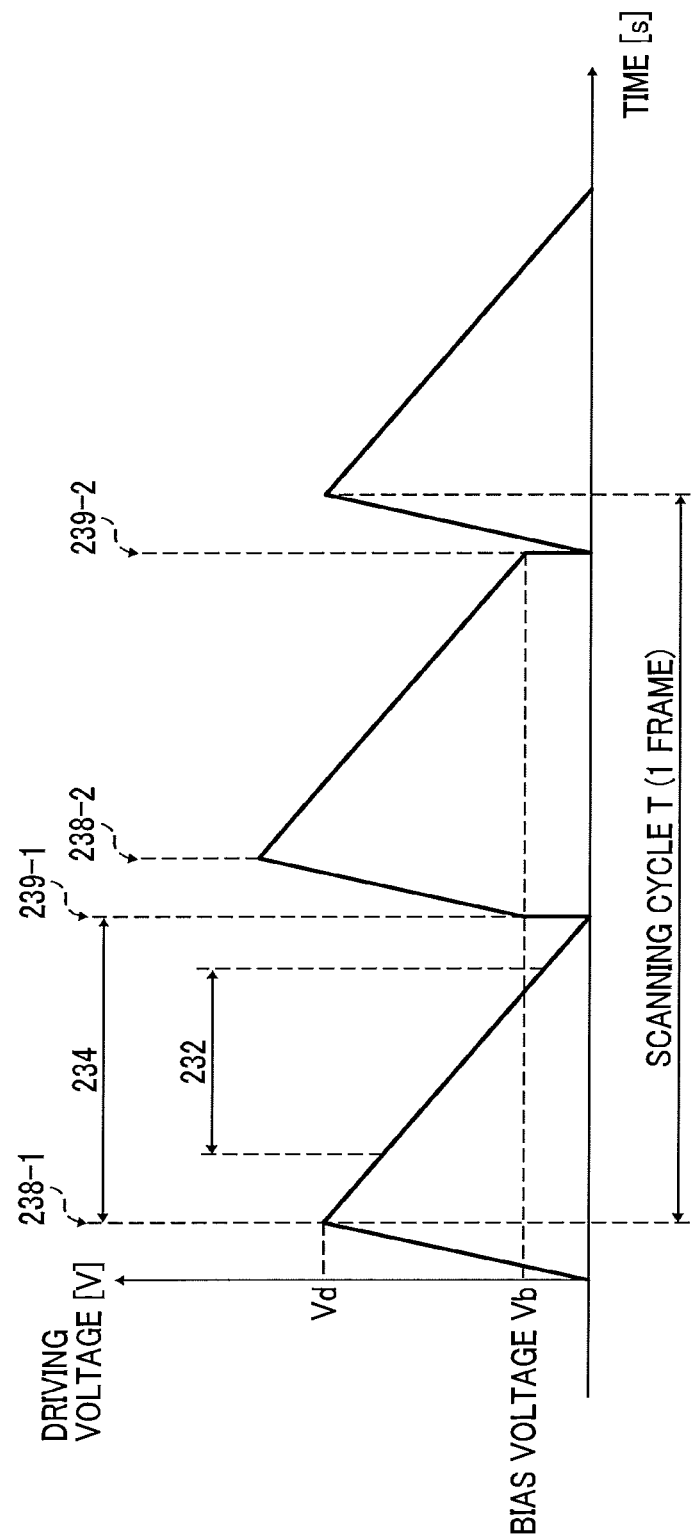
FIG. 13 is a graph illustrating the driving voltage that is applied to the optical deflector of FIG. 4, according to alternative embodiment of the present invention.

FIG. 13 is a graph illustrating the changes of the driving voltage that is applied to the MEMS mirror 21 when the intermediate image 231 of one frame is generated, according to the present embodiment.

Firstly, in the first scanning, the driving voltage Vd of predetermined magnitude is applied to the MEMS minor 21. Accordingly, the micromirror 210 changes the orientation of the reflection plane 2101 in the sub-scanning direction such that the first scanning beam 102-1 enters the first scanning starting point 238-1.

While the driving voltage decreases from "Vd" and reaches zero, the orientation of the micromirror 210 is changed according to the value of the driving voltage. By so doing, the first scanning beam 102-1 performs main scanning with resonance, and performs sub-scanning according to the changes in the magnitude of the driving voltage.

Subsequently, bias voltage Vb is added to the driving voltage Vd before starting the second scanning. Accordingly, the second scanning starts upon the driving voltage "Vd+Vb" being applied to the MEMS mirror 21. As described above, the operation of the micromirror 210 in the sub-scanning direction is controlled by the magnitude of the driving voltage. When the case of the driving voltage "Vd" is compared with the case of the driving voltage "Vd+Vb", the positions of the scanning starting point 238 are different from each other in the sub-scanning direction. The second scanning is performed while the driving voltage changes from "Vd+Vb" to "Vb".

Next, shifting of the amplitude's center 233 is described.

Figure 14:
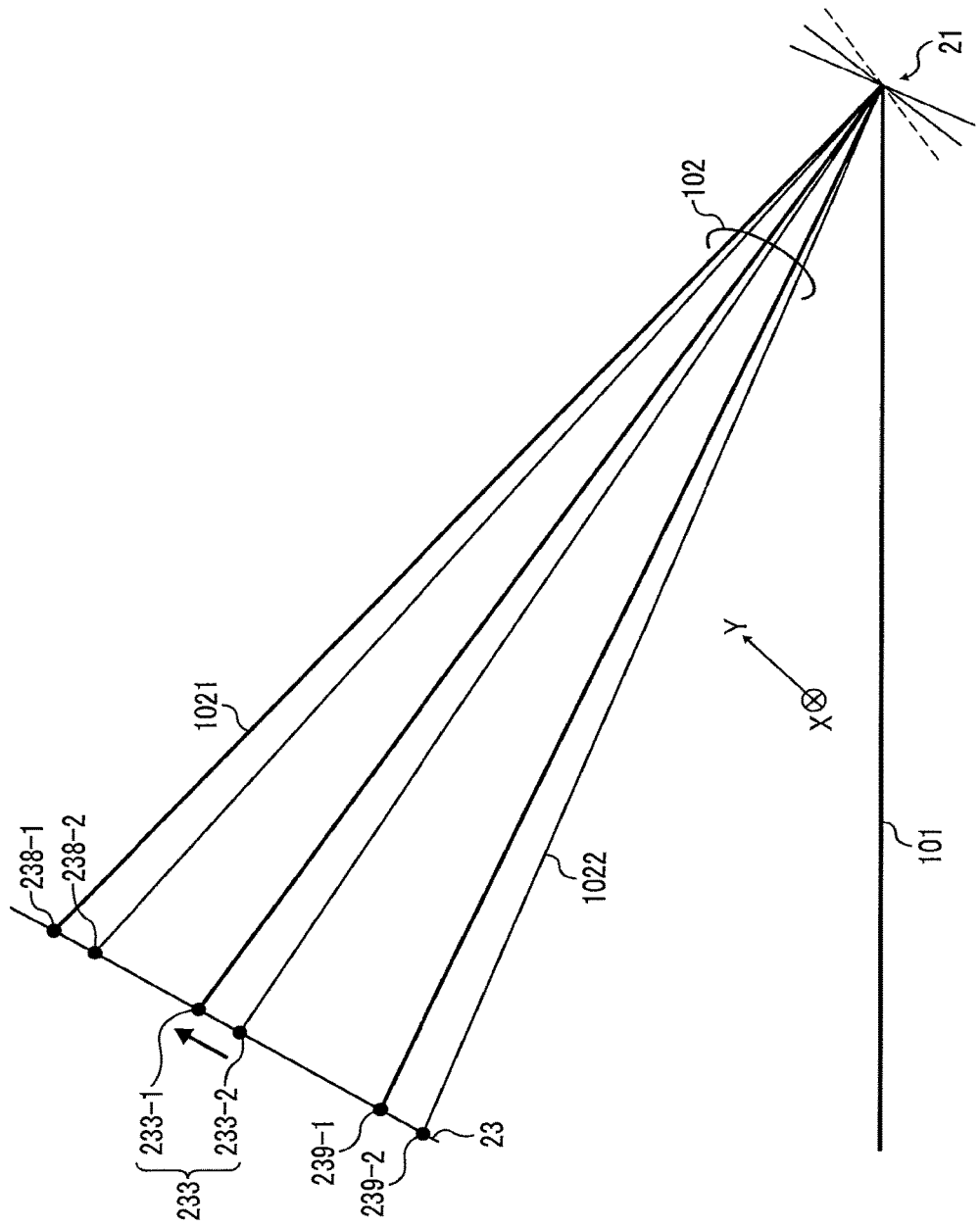
FIG. 14 is a diagram illustrating an optical arrangement of the optical deflector of FIG. 4 and the intermediate image generator of FIG. 5 when viewed from the main scanning direction, according to an embodiment of the present invention.

FIG. 14 is a diagram illustrating the optical arrangement of the MEMS minor 21 and the microlens array 23 when viewed from the main scanning direction, according to the present embodiment.

Note that in FIG. 14, only the MEMS minor 21 and the microlens array 23 are illustrated in a simplified manner When the first light beam 101 is deflected and scanned by the MEMS mirror 21, the second light beam 102 for the first scanning is referred to as a first scanning beam 102-1, and the second light beam 102 for the second scanning is referred to as a second scanning beam 102-2.

As described above, the scanning starting point 238 of the first scanning beam 102-1 on the microlens array 23 is different from the scanning starting point 238 of the second scanning beam 102-2 in the sub-scanning direction. The first scanning beam 102-1 and the second scanning beam 102-2 start two-dimensional scanning from two scanning starting points 238 that are different from each other, and terminate the two-dimensional scanning at two scanning ending points 239 that are different from each other.

As illustrated in FIG. 14, if the width of the gap between the first scanning starting point 238-1 and the first scanning ending point 239-1 that correspond to the first scanning beam 102-1 is considered to be the amplitude in the sub-scanning direction, the amplitude's center 233 of the first scanning beam 102-1 is a first amplitude's center 233-1. In a similar manner, if the width of the gap between the second scanning starting point 238-2 and the second scanning ending point 239-2 that correspond to the second scanning beam 102-2 is considered to be the amplitude in the sub-scanning direction, the amplitude's center 233 of the second scanning beam 102-2 is a second amplitude's center 233-2.

The HUD 1 according to the present embodiment performs two-dimensional scanning twice to generate the intermediate image 231 of one frame. The HUD 1 controls the MEMS mirror 21 such that the amplitude's center 233 of the first two-dimensional scanning is shifted from the amplitude's center 233 of the second two-dimensional scanning If the amplitude's center 233 of one two-dimensional scanning is shifted from the amplitude's center 233 of another two-dimensional scanning, as described above, development of moire on the intermediate image 231 can be prevented. In particular, the development of moire can be prevented around the periphery of intermediate image <231 in the main scanning direction.

The HUD 1 according to the present embodiment can be installed in a vehicle (see FIG. 1). In such a configuration, it is desired that the brightness of the virtual image 2 be varied according to the brightness of the background with which the virtual image 2 is to be displayed. In particular, in some cases, it is desired that the brightness of the virtual image 2 be decreased. The brightness of the intermediate image 231 is to be decreased to decrease the brightness of the virtual image 2.

The following are examples of a method of decreasing the brightness of the intermediate image 231 in the HUD 1 according to the present embodiment. In order to decrease the brightness of the intermediate image 231, the length of time during which the intermediate image 231 of one frame is irradiated with the second light beam 102 may be shortened. For example, the light source unit 10 may be controlled such that the first light beam 101 is emitted based on pulse control. In this configuration, the intermediate image 231 is generated with spaced dots that correspond to the pixels of the intermediate image 231. In other words, the intermediate image 231 can be dimmed by thinning out the dots.

In the HUD 1 according to the present embodiment, as illustrated in FIG. 10, the scanning line 237 performs go and return scanning in the scanning area 234 in the main scanning direction. In so doing, the first light beam 101 may be controlled to be emitted only in the first, half of the go and return scanning. In this configuration, the first light beam 101 is not emitted in, the second half of the go and return scanning. Accordingly, line thinning can be carried out, and the brightness of the intermediate image 231 can be decreased in half.

The intermediate image 231 can also be dimmed by reducing the number of times two-dimensional scanning is performed to generate the intermediate image 231 of one frame. In the above configuration, two-time two-dimensional scanning is reduced to one-time two-dimensional scanning. Alternatively, the dot thinning, the line thinning, the reduction in the number of times two-dimensional scanning is performed, or the like may be combined to control the rate of dimming of the intermediate image 231 as desired.

As described above, the HUD I according to the present embodiment performs two-dimensional scanning twice in order to generate the intermediate image 231 of one frame. Moreover, the scanning starting point 238 is shifted so as to be different between the first scanning and the second scanning Accordingly, the phase of the scanning line 237 is shifted for each time scanning is performed, and the density of the scanning line 237 on the intermediate image 231 increases in the sub-scanning direction. Moreover, the development of moire can be prevented. In particular, the development of moire can be prevented around the periphery of intermediate image 231 in the main scanning direction.

When the intermediate image 231 of one frame is generated, the timing at which the first two-dimensional scanning starts is shifted from the timing at which the second two-dimensional scanning starts by one fourth cycle. Accordingly, the density of the scanning line 237 on the intermediate image 231 increases in the sub-scanning direction, and the development of moire can be prevented. In particular, the development of moire can be prevented around the periphery of intermediate image 231 in the main scanning direction.

A similar effect can be achieved, for example, by shifting the scanning starting point 238 by one fourth cycle in two-time scanning, or shifting the amplitude's center 233 of the scanning line 237 in the sub-scanning direction.

The HUD 1 according to the present embodiment shifts the phase of the scanning line 237 by varying the bias components of the driving voltage that determines the operation of the MEMS minor 21 in the sub-scanning direction. In other words, when the intermediate image 231 of one frame is generated by performing scanning twice, the bias voltage of the driving voltage for the first scanning is set to have a voltage value different from the bias voltage of the driving voltage for the second scanning. Accordingly, the amplitude's center 233 of the scanning line 237 in the sub-scanning direction can be changed, and development of moire on the intermediate image 231 can be prevented. In particular, the development of moire can be prevented around the periphery of intermediate image 231 in the main scanning direction.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An image display apparatus, comprising:
a light source to emit a laser beam;
an optical deflector to deflect the laser beam two-dimensionally; and
an intermediate image generator to perform two-dimensional scanning twice in a main scanning direction and a sub-scanning direction with the laser beam deflected by the optical deflector to generate an intermediate image of one frame,
wherein in the two-dimensional scanning where the intermediate image of one frame is generated, a phase of a scanning line in scanning for a first time is different from a phase of a scanning line in scanning for a second time.

2. The image display apparatus according to claim 1, wherein the two different phases of the two scanning lines are shifted from each other by one fourth cycle.

3. An image display apparatus, comprising:
a light source to emit a laser beam;
an optical deflector to deflect the laser beam two-dimensionally; and
an intermediate image generator to perform two-dimensional scanning twice in a main scanning direction and a sub-scanning direction with the laser beam deflected by the optical deflector to generate an intermediate image of one frame,
wherein in the two-dimensional scanning where the intermediate image of one frame is generated, a starting position of a scanning line in the sub-scanning direction in scanning for a first time is different from a starting position of a scanning line in the sub-scanning direction in scanning for a second time.

4. The image display apparatus according to claim 3, wherein
the two-dimensional scanning for the first time and the two-dimensional scanning for the second time have two different start timings, respectively, and
the two different start timings are shifted from each other in the sub-scanning direction by one fourth cycle.

5. An image display apparatus, comprising:
a light source to emit, a laser beam;
an optical deflector to deflect the laser beam two-dimensionally; and
an intermediate image generator to perform two-dimensional scanning twice in a main scanning direction and a sub-scanning direction with the laser beam deflected by the optical deflector to generate an intermediate image of one frame,
wherein in the two-dimensional scanning where the intermediate image of one frame is generated, an amplitude center of a scanning line in the sub-scanning direction in scanning for a first time is different from an amplitude of a scanning line in the sub-scanning direction in scanning for a second time.

6. The image display apparatus according to claim 1, wherein
the optical deflector changes an amount of deflection in the sub-scanning direction according to a level of driving voltage, and
the driving voltage for the two-dimensional scanning for the first time and the driving voltage for the two-dimensional scanning for the second time have two different bias components, respectively.

7. The image display apparatus according to claim 3, wherein
the optical deflector changes an amount of deflection in the sub-scanning direction according to a level of driving voltage, and
the driving voltage for the two-dimensional scanning for the first time and the driving voltage for the two-dimensional scanning for the second time have two different bias components, respectively.

8. The image display apparatus according to claim 5, wherein
the optical deflector changes an amount of deflection in the sub-scanning direction according to a level of driving voltage, and
the driving voltage for the two-dimensional scanning for the first time and the driving voltage for the two-dimensional scanning for the second time have two different bias components, respectively.

9. The image display apparatus according to claim 1, wherein
the light source adopts pulse control to control a length of time during which the laser beam is emitted, to control dimming of the intermediate image.

10. The image display apparatus according to claim 3, wherein
the light source adopts pulse control to control a length of time during which the laser beam is emitted, to control dimming of the intermediate image.

11. The image display apparatus according to claim 5, wherein
the light source adopts pulse control to control a length of time during which the laser beam is emitted, to control dimming of the intermediate image.

12. The image display apparatus according to claim 1, wherein
the two-dimensional scanning performed by the intermediate image generator includes a plurality of scans in the main scanning direction, and a number of the scans is reduced to control dimming of the intermediate image.

13. The image display apparatus according to claim 3, wherein
the two-dimensional scanning performed by the intermediate image generator includes a plurality of scans in the main scanning direction, and a number of the scans is reduced to control dimming of the inter mediate image.

14. The image display apparatus according to claim 5, wherein
the two-dimensional scanning performed by the intermediate image generator includes a plurality of scans in the main scanning direction, and a number of the scans is reduced to control dimming of the intermediate image.

15. The image display apparatus according to claim 1, further comprising
an observation optical system disposed at a subsequent stage of the intermediate image generator, the observation optical system including a transmission and reflection member, wherein the intermediate image is projected onto the transmission and reflection member to display a virtual image.

16. The image display apparatus according to claim 3, further comprising
an observation optical system disposed at a subsequent stage of the intermediate image generator, the observation optical system including a transmission and reflection member,
wherein the intermediate image is projected onto the transmission and reflection member to display a virtual image.

17. The image display apparatus according to claim 5, further comprising
an observation optical system disposed at a subsequent stage of the intermediate image generator, the observation optical system including a transmission and reflection member,
wherein the intermediate image is projected onto the transmission and reflection member to display a virtual image.

18. A vehicle, comprising:
the image display apparatus according to claim 1,
wherein the image display apparatus displays the intermediate image to a driver as a virtual image.

19. A vehicle, comprising:
the image display apparatus according to, claim 3,
wherein the image display apparatus displays the intermediate image to a driver as a virtual image.

20. A vehicle, comprising:
the image display apparatus according to claim 5,
wherein the image display apparatus displays the intermediate image to a driver as a virtual image.

* * * * *